Figure 1:
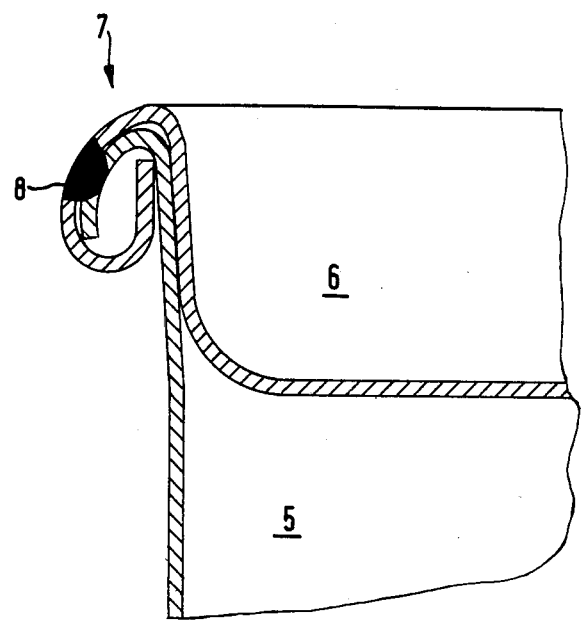

United States Patent [19]
Kögel

[11] Patent Number: 4,758,704
[45] Date of Patent: Jul. 19, 1988

[54] METHOD OF PRODUCING A FOLDED EDGE

[75] Inventor: Hermann Kögel, Öhringen, Fed. Rep. of Germany

[73] Assignee: Karl Huber Verpackungswerke GmbH & Co., Öhringen, Fed. Rep. of Germany

[21] Appl. No.: 853,618

[22] Filed: Apr. 18, 1986

[30] Foreign Application Priority Data

Apr. 22, 1985 [DE] Fed. Rep. of Germany ....... 3514519

[51] Int. Cl.⁴ .............................................. B23K 26/00
[52] U.S. Cl. ................................................ 219/121.64
[58] Field of Search ................. 219/121 LC, 121 LD, 219/121 L, 121 LM, 64

[56] References Cited

U.S. PATENT DOCUMENTS 3,440,392 4/1969 Erlandson et al. ........... 219/121 EC
3,949,186 4/1976 Nakayama et al. ..... 219/121 LD X

FOREIGN PATENT DOCUMENTS 0179284 10/1984 Japan .......................... 219/121 LD Primary Examiner—C. L. Albritton
Attorney, Agent, or Firm—Max Fogiel

[57] ABSTRACT

A method of producing a folded edge between the body and base and/or upper base of a container made out of fine and/or extra-fine sheet metal, whereby at least two layers of the fold are bonded together at least at various points along the at least almost finish-folded edge by means of fusion welding.

4 Claims, 3 Drawing Sheets

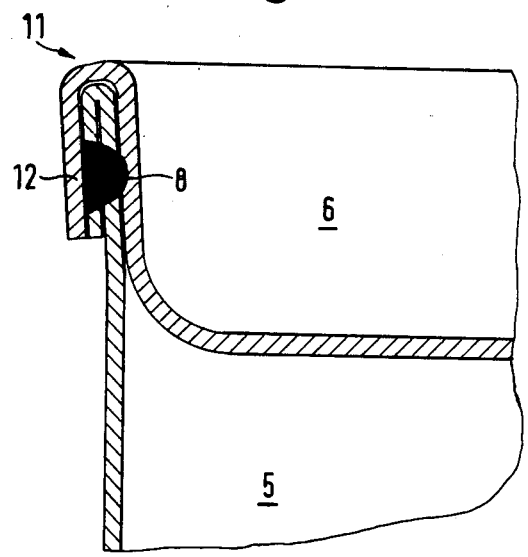

METHOD OF PRODUCING A FOLDED EDGE

The invention concerns a method of producing a folded edge in accordance with the preamble to the major claim.

The body of containers made out of fine or extra-fine sheet metal, paint cans and similar containers for example, is usally produced with a welded joint along the longitudinal seam. Otherwise, the base or upper base is folded to create a folded edge, specifically with a seal inserted as a rule.

The tightness of containers of this type must be ensured subject to all conditions, including vacuum and pressure, especially during the shipment of hazardous materials. A complicated folded edge, with a least a double fold and sometimes even a triple fold, is accordingly usually created. Since thicker-gauge sheet metal, however, is less deformable, and since the folded edge will have less mechanical strength, dropping a full container from even a slight elevation will buckle the fold at that point, so that the tightness of the container can no longer be sufficiently ensured, which cannot be allowed especially in the case of hazardous materials.

Eliminating this defect by using thicker sheet is an obvious step, but also makes the container not only more expensive but considerably heavier.

The object of the invention is to provide a method of the generic type by means of which the containers can be sealed permanently, reliably, and dependably even subject to mechanical stresses without increasing the thickness of the sheet.

This object is attained in a surprisingly simple way in accordance with the invention by means of a method of the generic type with the characteristics of the body of the major claim.

A simple folded edge is created in accordance with the invention with considerably more mechanical strength that results just from a joint produced by welding at particular points. The folded edge is reliably prevented from buckling subject to mechanical impact stress. The seam can be precisely placed and the intensity adjusted in such a way that the desired number of layers in the folded edge can be welded together especially by means of fusion welding with a laser. Another advantage is the very small welding site, which renders the folded edge attractive on the exterior and makes further operations unnecessary.

In an especially preferred embodiment of the invention the welding occurs at the finish-folded edge. Also preferred is welding over the total folded area, and accordingly with a continuous seam. This considerably increases the height that the container can fall from without damage. The fold is absolutely tight, and there is no need for any type of inserted seal.

Other embodiments of the invention will be evident from the subsidiary claims. The method in accordance with the invention of manufacturing a novel container will now be described in detail with reference to the drawings. Of these, FIG. 1 is an incomplete and partly broken section through the almost finished folded edge of a container, FIG. 2 illustrates the folded edge illustrated in FIG. 1 in the finish-folded state, FIG. 3 illustrates another embodiment of a folded edge, FIG. 4 a third embodiment of a folded edge, and FIG. 5 a fourth embodiment of a folded edge.

Figure 2:
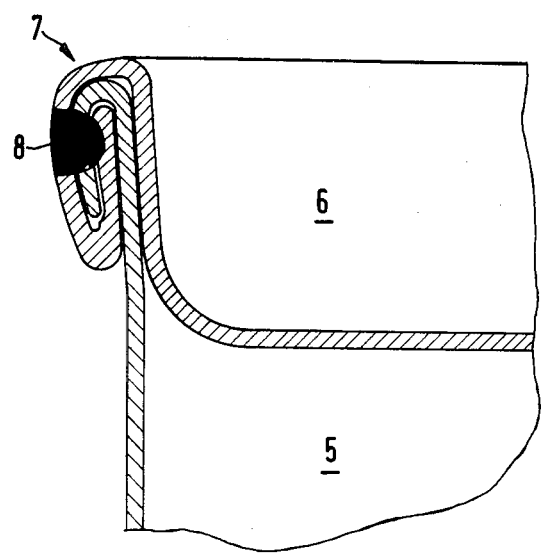

FIG. 1 illustrates the body 5 and upper base 6 of a container that are to be joined creating a five-layer folded edge 7. The folded edge has at this stage been only incompletely produced and a fusion weld in the form of a welding line 8 applied—from outside—bonding two layers of folded edge 7 together. FIG. 2 illustrates the completed folded edge 7.

Figure 3:
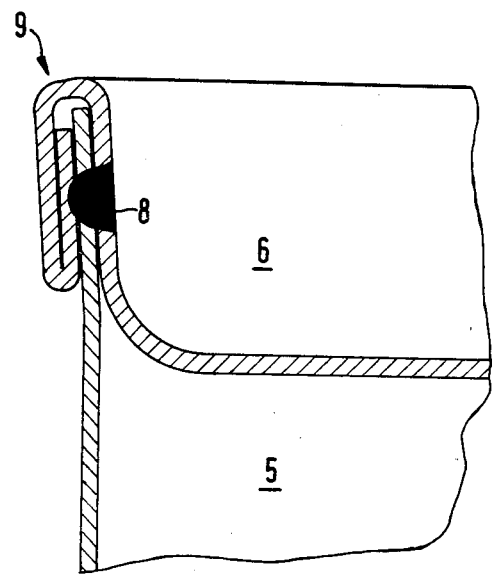

The second embodiment, illustrated in FIG. 3, has a four-layer folded edge 9 with a weld 8 applied to the finish-folded edge 9 from inside.

Figure 4:
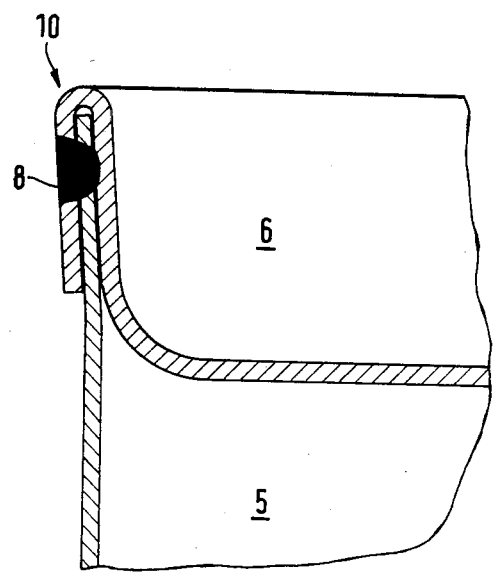

FIG. 4 illustrates a third embodiment of a container manufactured by the method in accordance with the invention and having a three-layer folded edge 10 in which the weld has been applied from outside and involves all three layers.

FIG. 5 illustrates a third embodiment, a container in which the edge 11 is not initially finish-folded. What will eventually be the outer layer 12 of upper base 6 has not as yet been finally folded down. The welding is carried out at this unillustrated stage, with the three layers being welded together, specifically body 5 and its outwardly folded outer edge to upper base 6. Only then is layer 12 folded down over weld 8, covering up welding seam 8. No further operations are necessary because the welded seam is invisible from outside.

I claim:

1. A method for producing a folded edge between a body and base member of a container fabricated in a mass production line comprising: providing sheet metal for said body and base member; folding together edges of sheet metal of said body and said base member to produce a multi-layer folded edge; bonding together by laser fusion welding at least two layers of said folded edge at various point along said folded edge when said edge is at least almost finish-folded; said laser fusion welding being carried out by a laser beam directed radially outward at the folded edge at an angle ranging from a vertical position to a horizontal position.

2. A method for producing a folded edge between a body and base member of a container fabricated in a mass production line comprising: providing sheet metal for said body and base member; folding together edges of sheet metal of said body and said base member to produce a multi-layer folded edge; bonding together by laser fusion welding at least two layers of said folded edge at various point along said folded edge when said edge is at least almost finish-folded; said edge being almost finish-folded, and said laser fusion welding being carried out by a laser beam directed radially from the outside in at said almost finish-folded edge and welding at least two layers together; and finish-folding the edge thereafter with at least one layer folded over to cover up the welded seam.

3. A method for producing a folded edge between a body and base member of a container fabricated in a mass production line comprising: providing sheet metal for said body and base member; folding together edges of sheet metal of said body and said base member to produce a multi-layer folded edge; bonding together by laser fusion welding at least two layers of said folded edge at various point along said folded edge when said edge is at least almost finish-folded; said laser fusion welding being carried out with a laser beam directed radially inward at the folded edge at an angle ranging from a vertical to a horizontal position, said laser beam being directed at the body of said container; and folding over one layer of said base member so that it covers up the welding seam.

4. A method as defined in claim 2, wherein said laser beam is directed at the body of said container; and folding over one layer of said base member to cover up the welding seam.

* * * * *